Dec. 7, 1965  L. G. OTTEMAN  3,222,089
SECONDARY RELEASE MECHANISM FOR FLUID ACTUATED COUPLINGS
Filed Nov. 9, 1962  5 Sheets-Sheet 1

INVENTOR:
LLOYD G. OTTEMAN
BY: *John R. Wilkens*
HIS ATTORNEY

Dec. 7, 1965  L. G. OTTEMAN  3,222,089
SECONDARY RELEASE MECHANISM FOR FLUID ACTUATED COUPLINGS
Filed Nov. 9, 1962  5 Sheets-Sheet 2

INVENTOR:
LLOYD G. OTTEMAN
BY: *John R. Williams*
HIS ATTORNEY

INVENTOR:
LLOYD G. OTTEMAN
BY: *John R. Uillema*
HIS ATTORNEY

INVENTOR:
LLOYD G. OTTEMAN
BY: *John R. Wildema*
HIS ATTORNEY

United States Patent Office 3,222,089
Patented Dec. 7, 1965

3,222,089
SECONDARY RELEASE MECHANISM FOR
FLUID ACTUATED COUPLINGS
Lloyd G. Otteman, Metairie, La., assignor to Shell Oil
Company, New York, N.Y., a corporation of Delaware
Filed Nov. 9, 1962, Ser. No. 236,645
6 Claims. (Cl. 285—18)

This invention relates to a method and apparatus for coupling components used on offshore wells and pertains more particularly to an improved remotely operable coupling apparatus adapted to securely lock conduits used on underwater installations in fluid communication. The invention is especially concerned with an improvement of the apparatus disclosed in copending application Serial No. 127,054, filed July 26, 1961, now Patent No. 3,163,223 and entitled "Wellhead Connector," wherein there is disclosed a coupling apparatus for connecting a wellhead component, such as a blowout preventor, to a vertically extending wellhead member in a securely locked and fluid tight manner. More specifically, the present invention is directed to a coupling apparatus as disclosed in the latter application wherein the coupling is provided with an alternative operating system to facilitate emergency operation of the apparatus.

Recently, in attempts to locate new oil fields, an increasing amount of well drilling has been conducted at offshore locations, such for example, as off the coasts of Louisiana, Texas and California. As a general rule, in these attempts the wells are provided with strings of casing and tubing which extend to a point above the surface of the water at the offshore location of the well. Extending the casing and tubing strings above the surface of the water has the advantage that the strings may be closed and operated by surface-type operating procedures, with a conventional wellhead assembly being attached to the top of the casing. Extending the well strings and the wellhead assembly secured thereto to the surface of the water at offshore locations has the obvious disadvantage, however, that the extended structure presents a hazard to navigation and is also exposed to the corrosive action of salt water and air. Furthermore, when operating at depths ranging in hundreds of feet, the extension of well strings to the surface of the water often becomes infeasible as a practical matter. In order to avoid these disadvantages, attempts have recently been made to provide methods and apparatuses for drilling and completing offshore wells wherein both the well casinghead and subsequently the wellhead assembly and casinghead closure device are located underwater at a depth sufficient to allow ships to pass over them. Preferably, the casinghead and wellhead closure assemblies are located close to the ocean floor to avoid all of the disadvantages accompanying the extension of lengths of well string above the floor of the ocean. In locating equipment in this manner, depths are often encountered exceeding the relatively shallow depth at which a diver can safely and easily operate and, thus it has been necessary to design new equipment and procedures for this purpose. Copending application Serial No. 830,538, filed July 30, 1959, and entitled "Underwater Well Completion Method," describes a method of completing offshore wells on the ocean floor. A remotely actuated coupling apparatus well adapted for use in securing components in the underwater well completion method of the latter application is disclosed in aforementioned copending patent application Serial No. 127,054.

In the remote controlled installation and operation of underwater well components there is always the possibility that remote actuators may become damaged or inoperative. This possibility poses a particular hazard in underwater installations located at depths beyond those accessible to human divers, since emergency operations under such circumstances are difficult if not impossible to carry out. The present invention provides a method and apparatus to facilitate emergency operation under such conditions.

It is therefore a primary object of this invention to provide a method and apparatus for coupling and uncoupling underwater wellhead components by remote control under both favorable and adverse conditions.

It is another object of the invention to provide an apparatus to remotely connect conduits to an underwater wellhead assembly wherein the conduits may be lowered to the assembly and secured thereto in a fluid tight manner, with the securing operation being carried out from a remote location.

Another object of the invention is to provide a remotely controlled hydraulically operated coupling device for securing wellhead components in position under any conditions of well pressure.

A further object of the invention is to provide a wellhead connector device and sealing apparatus which may be readily unlocked from an underwater wellhead and withdrawn to an operational base remote from the wellhead, such for example as a drilling barge or platform.

Another object of the invention is to provide an underwater coupling apparatus having operative components which are normally isolated from sea water and marine growth and are thus not subject to fouling due to corrosion of other obstructions.

Yet another object of the invention is to provide a remotely controlled fluid pressure actuated conduit coupling apparatus wherein the fluid pressure is normally supplied from an external source, but wherein fluid pressure may be supplied through the coupled conduits should the external source become inoperative.

These and other objects of the invention will become apparent from the following description and accompanying illustrations.

In its broadest aspect, the present invention provides a method for imparting secondary fluid actuating pressure to the primary fluid pressure system of a fluid pressure actuated mechanism secured to a conduit. Broadly, the method comprises establishing fluid communication between the interior of the conduit and the primary fluid pressure system of the mechanism, and subjecting the primary fluid pressure system to fluid under pressure supplied through the conduit.

Basically, the apparatus of the invention is directed to an arrangement for selectively uncoupling a conduit from an underwater installation. The apparatus includes a lockdown assembly secured to the conduits adjacent a free end thereof and a lockdown receiver fixed to the underwater installation. The receiver is dimensioned to receive the lockdown assembly in seated telescopic engagement therewith, and the lockdown assembly carries locking elements which are moveable with respect thereto into and out of locked engagement with the receiver when the assembly is in telescopic engagement therewith. The apparatus further includes fluid pressure operated actuating means carried by the lockdown assembly and operatively associated with the locking elements to selectively move the locking elements into engagement with the receiver. Fluid pressure is supplied to the actuating means through a manifold system extending through the lockdown assembly into communication with the actuating means. The manifold system communicates with a primary external source of operating pressure through a passage connected thereto and extending to said source. In order to provide a secondary source of fluid pressure for the actuating means, rupturable diaphragms are interposed between the manifold system and the interior of the conduit. Through the latter provision, should the external source of fluid pressure become inoperative, the diaphragms may be ruptured to expose the actuating means to fluid pressure supplied through the conduit.

From the foregoing brief description, it is believed apparent that the present invention provides for the selective uncoupling of a conduit from an underwater installation through a primary or an alternative operating system. The operation of the invention will be more definitely understood when viewed in light of the following detailed description and accompanying illustrations, wherein:

Figure 1:
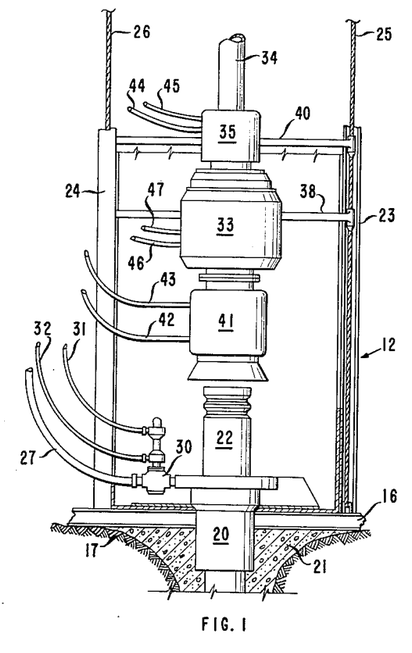
FIGURE 1 is a diagrammatic view illustrating an application of the present invention, including a drilling or workover barge positioned at the surface of the water and a well located at the floor of the body of water beneath the barge.

Referring now to FIGURE 1 of the drawings, a drilling workover barge 10 is shown positioned at the surface of a body of water 11 in a location approximately directly above a well station 12. The barge 10 is preferably of the floating type and is adapted to operate in depths of water of from about 100 to 1500 feet or more. The barge 10 may be maintained at the desired location through means of alternative positioning apparatus, such as the anchor lines 13 and 14 extending from the barge to anchors (not shown) located at the floor of the body of water. As illustrated in FIGURE 1, the barge 10 includes a derrick 15 adapted to be used in lowering equipment to and from the well station 12 and a series of remote control operating lines extending from the barge to the station.

The well station 12 includes a wellhead structure 16 cemented in place at the floor 17 of the body of water 11. As shown in FIGURE 1, the wellhead structure 16 rests on the floor 17 and has a casing 20 extending into the floor in cemented engagement therewith as illustrated by the cement portion 21. The wellhead structure 16 further includes a casinghead 22 extending upwardly from the casing 20 and at least one pair of upwardly extending guide columns 23 and 24. Guide lines 25 and 26 are secured to the wellhead structure 16 and extend through the columns 23 and 24, respectively, and up to the barge 10. The guide lines 25 and 26 and the guide columns 23 and 24 cooperating therewith facilitate the raising and lowering of components from the wellhead structure, as will be developed subsequently. The manner in which the well station 12 is initially developed and the wellhead structure 16 is secured thereto is disclosed in aforementioned copending application Serial No. 830,538. The latter application develops the method by which cementing apparatus, such as the cement line 27, cement valve 30 and valve actuating lines 31 and 32 are utilized to anchor the wellhead structure 16 in place through the cement portion 21.

Figure 9:
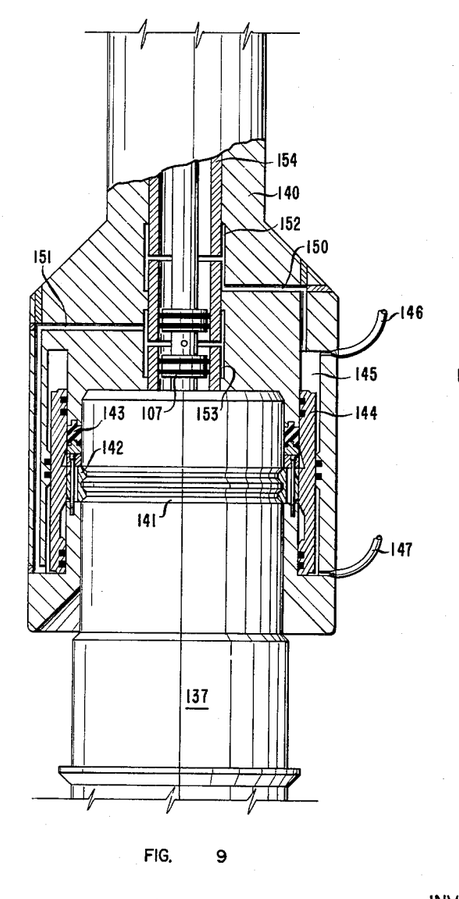
FIGURE 9 is a detailed vertical section of another embodiment of the apparatus of the present invention wherein the inter-relationship of the engaging components of the coupling has been substantially reversed from the embodiments of FIGURE 5 and FIGURE 8; and, FIGURE 10 is a detailed vertical section of yet another embodiment of the invention incorporating a coupling or locking structure having a modified locking and actuating structure.

After the wellhead structure 16 has been secured in place, it is in condition to receive components, such as workover structure, drilling structure, or production structure, from the barge 10. FIGURE 1 illustrates a blowout preventor 33 being lowered down the guide lines 25 and 26 to the wellhead structure 16. In the illustration, the blowout preventor 33 is being lowered on a pipe or running string 34 secured thereto by a running tool 35. The running string 34 extends upwardly from the running tool 35 and is suspended from the derrick 15 through means of a pair of elevators 36 joined to the traveling block 37 of the derrick by conventional link and hook elements. Thus, the derrick 15 may be utilized to lower the running string 34 and the components secured thereto in the conventional manner. During lowering, the running string 34 and the components secured thereto are guided towards alignment with the wellhead structure 16 through means of guide arms 38 and 40 secured to the blowout preventor 33 and running tool 35, respectively. The latter guiding operation is clearly disclosed in aforementioned application Serial No. 830,538. In order to secure the blowout preventor 33 to the casinghead 22, a coupling mechanism 41 of the present invention is secured to the lower surface of the preventor. The coupling mechanism 41, as will be described subsequently with respect to FIGURE 9, is provided with fluid pressure operated actuating means adapted to secure the mechanism in locked and sealed engagement with the casinghead 22. The mechanism 41 is adapted to be remotely operated through primary fluid pressure lines 42 and 43 extending to a controlled source of fluid under pressure on the barge 10. In addition, the coupling mechanism 41 is provided with an alternative operating system which will be developed in detail with reference to the subsequent figures. It is noted that the running tool 35 may be provided with a coupling mechanism corresponding substantially to the mechanism 41 and that fluid pressure may be conveyed to this mechanism through lines 44 and 45. The lines 46 and 47 are the conventional hydraulic actuating lines necessary for the operating of the blowout preventor 33.

Although the barge, wellhead structure and the guide and operating structure used therewith are only illustrated in FIGURE 1, it is to be understood that this supporting structure would also be used in combination with the other detailed apparatuses which will be described herein. Furthermore, the coupling structure of the present invention is not intended to be limited to the illustrated applications. For example, in addition to using the coupling apparatus in combination with the illustrated drilling or workover structures and the illustrated production assemblies, it is anticipated that the coupling apparatuses might equally well find use with other underwater installations, such as underwater trap farms utilized in the production and storage of well products.

Figure 3:
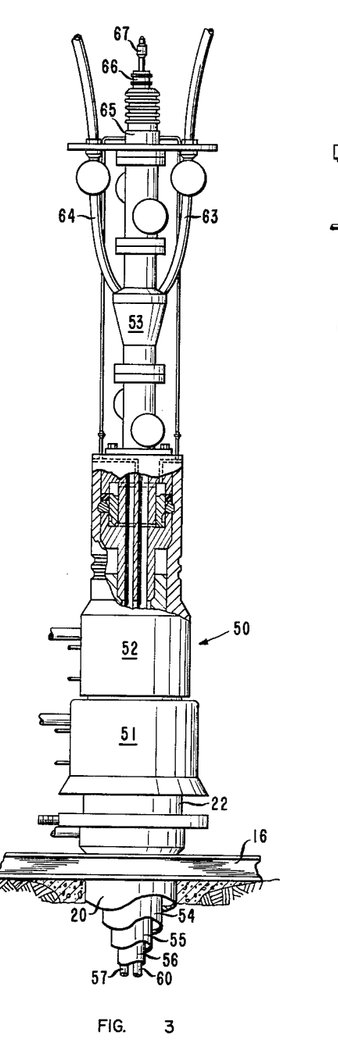
FIGURE 3 is an enlarged view of the production assembly illustrated in FIGURE 2, with the running string removed therefrom.
Figure 4:
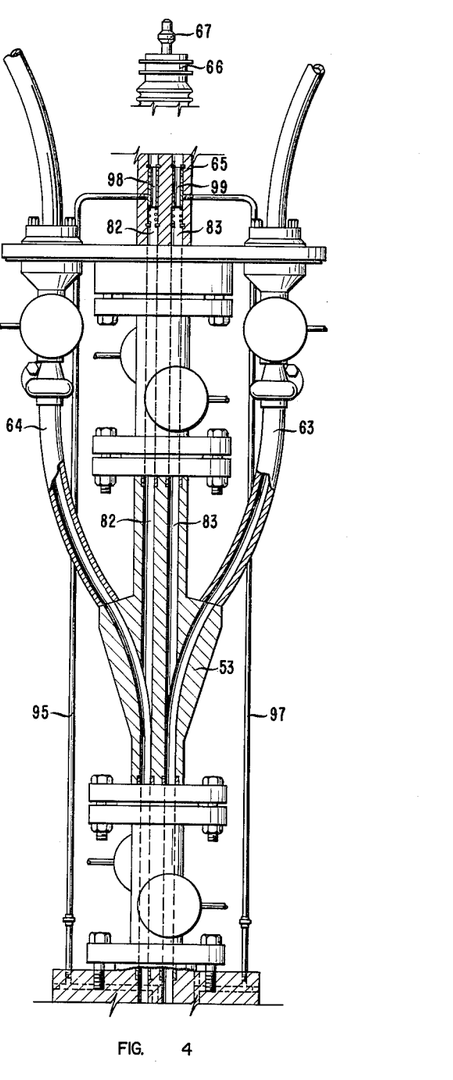
FIGURE 4 is an enlarged vertical section of the upper end of the production assembly illustrated in FIGURE 3.
Figures 5, 6, 7:
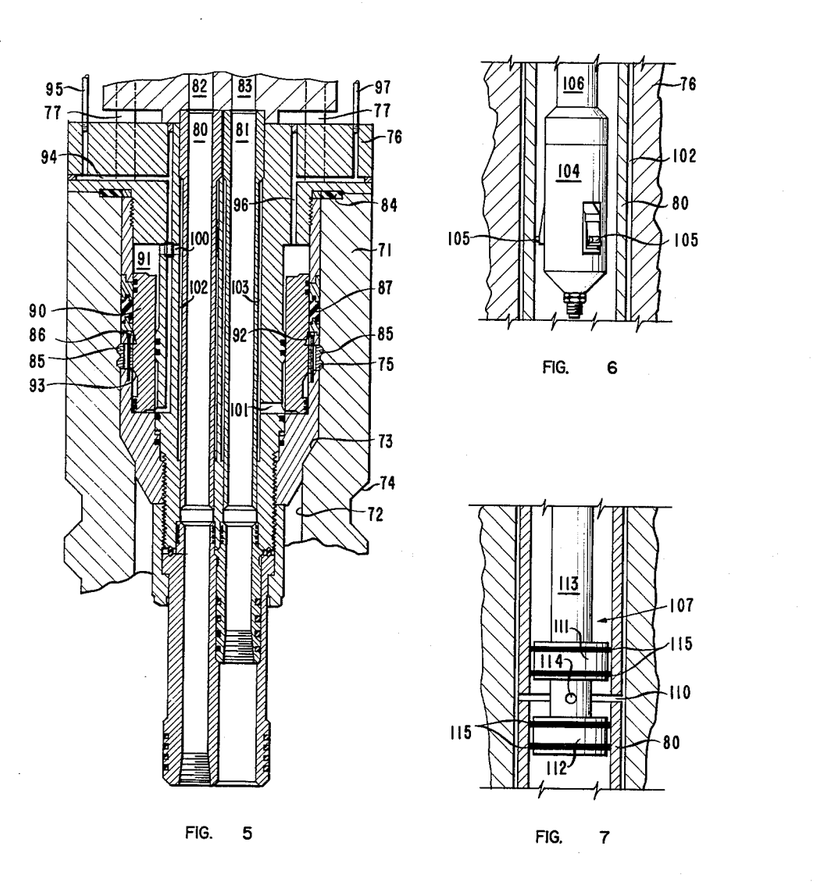
FIGURE 5 is a detailed vertical section of a coupling apparatus of the present invention adapted to be used in the wellhead assemblies illustrated in FIGURES 1 to 4.
FIGURES 6 and 7 are vertical sections illustrating a casing cutter and packer assembly, respectively, suited for use in initiating the operation of the present invention.

FIGURES 2 to 5 illustrate a wellhead assembly similar to that described in copending application Serial No. 834,096, filed August 17, 1959, entitled "Wellhead Assembly Lockdown Apparatus." The assembly of FIGURES 2 to 5 differs from the copending application primarily in that it incorporates the lockdown apparatus of the present invention, as shown in detail in FIGURE 5. Referring now to the detailed structure illustrated in the drawings, the numeral 50 designates the production wellhead assembly in its entirety, as positioned on a casinghead 22 corresponding to that described with reference to FIGURE 1. The production wellhead assembly 50 consists of three major elements comprising a wellhead connector 51 received on the casinghead 22, a landing head 52 received on the upper end of the wellhead connector and a production assembly 53 received within the upper end of the landing head. The connections between the casinghead 22 and the wellhead connector 51 and the above mentioned major elements of the wellhead assembly include the coupling apparatus of the present invention, as will be described in detail subsequently.

Figure 2:
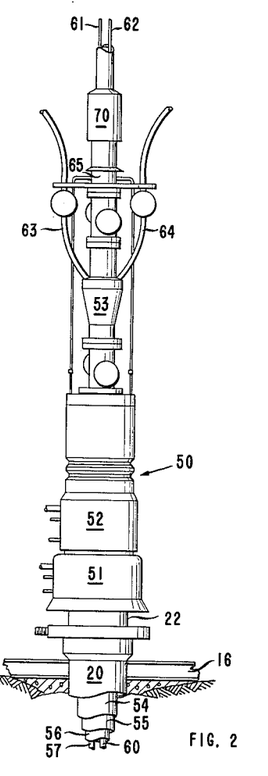
FIGURE 2 is an elevational view of the well shown in FIGURE 1, wherein a production assembly is secured to the well through means of the apparatus of the present invention.

In the operative condition illustrated in FIGURES 2 and 3, the wellhead assembly 50 also includes casing strings 54 to 56 extending down from the casinghead 22 from conventional hanging means, such as are disclosed in the aforementioned copending application Serial No. 834,096. As described in the latter application, tubing or production strings 57 and 60 extend through the innermost casing string 56 into communication with tubing extension strings and flowlines connected to the wellhead assembly through the production assembly 53. The tubing extension strings designated as 61 and 62 are releasable attached to the production assembly and the flowlines designated as 63 and 64 are fixedly attached to the production assembly as illustrated in FIGURE 2. The manner in which the tubing strings 61 and 62 and flowlines 62 and 64 are adapted to communicate with the tubing strings 57 and 60 is illustrated in section in FIGURES 3 and 4 and described in detail in the aforementioned copending application Serial No. 834,096. At this point, it is noted that the tubing extension strings 61 and 62 leading into the wellhead assembly illustrated in FIGURE 2 are not shown in the corresponding assemblies illustrated in FIGURES 3 and 4. This apparent difference is merely the result of illustrating the wellhead assembly in different stages of its operation. In FIGURES 3 and 4, the production assembly 53 is shown as having a closure member body 65 at the upper end thereof, which closure member is capped by a plug 66 having a fishing head 67 extending upwardly therefrom. As shown in FIGURE 2, the closure member body 65 is identical to that of FIGURES 3 and 4, but is illustrated with the plug 66 removed therefrom and with a running head 70, having the tubing strings 61 and 62 passing therethrough and into the production assembly. A detailed description of the closure member body 65, plug 66 and running head 70 adapted to cooperate therewith is disclosed in copending application Serial No. 218,482, filed August 16, 1962 and entitled "Wellhead Closure Apparatus."

Referring now to FIGURE 5, therein is illustrated a detailed vertical section of the coupling apparatus shown diagrammatically in the broken-away section of FIGURE 3. The apparatus includes a receiver or socket member 71 in the form of a casing suspension housing fixed to the upper end of the landing head 52. In actual construction, the receiver 71 may be either formed as an integral part of the landing head 52, or it may be fixedly attached thereto, as by threads. The receiver 71 has extending therethrough a passage 72, having a shoulder 73 formed therein and converging into a necked-down portion. The receiver 71 further includes an exterior locking recess 74 formed around the outer periphery thereof and an interior locking recess 75 formed annularly around the passage 72 above the shoulder 73 therein.

In the condition illustrated in FIGURE 5, the production assembly 53 is shown secured to the receiver 71 through a locking assembly 76 fixed to the production assembly and received in locking engagement with the interior of the receiver. Although the receiver 71 is only illustrated with an internal lockdown assembly telescoped therein, it is to be understood that the receiver is also adapted to receive an external lockdown assembly in telescopic engagement therewith, as will be developed subsequently. The lockdown assembly 76 is fixed to the production assembly 53 by bolts 77 extending through the production assembly into threaded engagement with the lockdown assembly. When fixed in this manner, conduits or tubes 80 and 81 secured to and extending through the lockdown assembly communicate in sealed relationship with conduits or passages 82 and 83 extending through the production assembly into communication with the flowlines 63 and 64 and/or the tubing strings 61 and 62. The conduits 80 and 81 are in turn adapted to communicate with the tubing strings 57 and 60, respectively, when the lockdown assembly 76 is received in engagement with the receiver 71, as shown in FIGURE 5. Preferably, in the telescoped relationship illustrated in FIGURE 5, a resilient seal 84 is interposed between the receiver 71 and the lockdown assembly 76.

Reference will now be made to the locking and sealing mechanism adapted to secure the receiver 71 and lockdown assembly 76 in the relationship illustrated in FIGURE 5. This mechanism includes a plurality of spaced locking dogs 85 positioned around the lockdown assembly 76 for limited radial extension with respect thereto. The dogs 85 are located so as to assume an aligned relationship with the interior locking recess 75 when the lockdown assembly 76 and the receiver 71 are in telescopic engagement. Thus, upon extension as illustrated in FIGURE 5, the dogs 85 lockingly engage the recess 75 and secure the receiver and lockdown assembly in seated engagement. In order to limit the degree to which the dogs 85 may be extended, anchor pins or bolts 86 extend through enlarged axial openings in the dogs into fixed engagement with the body of the lockdown assembly. The locking and sealing mechanism further includes a resilient annular sealing element 87 extending around the lockdown assembly 76 for radial extension with respect thereto.

Extension of the locking dogs 85 and sealing element 87 is accomplished through means of an actuating piston 90 received in an annular recess 91 of the lockdown assembly 76 for reciprocating movement therein. The actuating piston 90 takes the form of a cylinder having cammed surfaces on the outer surface thereof which are adapted to radially extend the locking dogs 85 and sealing element 87 on downward movement of the piston and to permit retraction of the locking dogs and sealing element on upward movement of the piston. Preferably, the outer surface of the actuating piston 90 is provided with a pair of cammed surfaces 92 and 93 adapted to simultaneously extend both the locking dogs and the sealing element. Although a single cammed surface could feasibly extend the locking dogs and sealing element sequentially, the use of a pair of cammed surfaces has the advantage that the piston stroke is minimized. It is noted that the rearmost surfaces of the dogs 85 are provided with beveled edges to facilitate extension of the dogs by the cammed surface 93 of the actuating piston, and that the cammed surface 93 has a recess therebelow of sufficient size to permit the dogs 85 to be retracted thereinto when the piston 90 is in its uppermost position (not shown).

In such a retracted position, the outer surfaces of the locking dogs 85 are flush with the outer surface of the lockdown assembly and thus the lockdown assembly may be removed from the receiver 71. In order to facilitate retraction of the locking dogs 85 and removal of the lockdown assembly 76 from the receiver 71, the outer upper edges of the locking dogs are preferably beveled so that the dogs are readily retracted upon pulling the lockdown assembly upwardly with respect to the receiver.

In order to reciprocate the actuating piston 90 within the annular recess 91, a fluid manifold system communicates with the upper and lower ends of the recess. The manifold system includes a first conduit 94 communicating with the lower end of the annular recess 91 and extending through the lockdown assembly 76 to a primary actuating line 95 communicating with a source of controlled fluid under pressure. The manifold system further includes a second conduit 96 communicating with the upper end of the recess 91 and extending through the lockdown assembly 76 to a primary actuating line 97 communicating with a source of controlled fluid under pressure. In normal operation, the source of controlled fluid under pressure communicating with the lines 95 and 97 preferably is derived from fluid pressure within the conduits 82 and 83. Referring in detail to FIGURE 4, this pressure is derived by extending the lines 95 and 97 into communication with the conduits 82 and 83 and is controlled through means of apertured sleeve valves 98 and 99 interposed between the lines 95 and 97 and the interior of the conduits 82 and 83. The sleeve valves 98 and 99 are slidably received in the conduits 82 and 83 and are biased to a normally closed position by springs positioned therebelow. In order to open either one or both of the valves 97 and 98 a valve shifting tool, such as described on page 1976, FIGURES 2 and 3 of the 1957 Composite Catalogue of Oil Field Equipment, may be used. Thus, with this arrangement, when it is desired to subject the lines 95 and 97 to a differential in pressure it is merely necessary to impose a pressure differential across the lines 82 and 83 and open the sleeve valves 98 and 99. It is to be understood that the external source of fluid under pressure communicating with the lines 95 and 97 is not necessarily limited to that derived from conduits 82 and 83. For example, the lines 95 and 97 may be fabricated of a flexible material and extended to a source of fluid pressure disposed at a remote operating station, such as barge 10 of FIGURE 1.

The manifold system of FIGURE 5 also includes an alternative operating system comprising auxiliary or secondary actuating passages 100 and 101 communicating with the upper and lower ends, respectively, of the annular recess 91 to provide an alternative source of fluid pressure therefor. The passage 100 communicates with a thin normally closed annular chamber 102 surrounding the conduit 80 and the passage 101 communicates with a thin annular chamber 103 separate from the chamber 102 and surrounding the conduit 81. During the normal operation of the lockdown assembly 76, the chambers 102 and 103 and the passages communicating therewith are isolated from the interior of the conduits 80 and 81 and, thus the alternative operating system remains inoperative. It is noted that the walls of the conduits 80 and 81 serve as diaphragms or barriers to isolate the chambers 102 and 103 from the interior of the conduits, and that these walls are fabricated so as to be rupturable by conventional casing cutters. Therefore, should the primary actuating lines 95 and 97 become inoperative due to damage or fouling, the manifold system of the lockdown assembly may be supplied with fluid pressure by rupturing the walls of the conduits 80 and 81 to expose the annular chambers 102 and 103 to fluid pressure within said conduits. The latter fluid pressure may in turn be controlled and utilized to reciprocate the actuating piston 90 and thus operate the lockdown assembly.

FIGURES 6 and 7 illustrate cutting and packer apparatuses, respectively, suitable for activating and controlling the above described alternative operating system. The cutting apparatus comprises a conventional casing cutter 104 adapted to be lowered into the lockdown assembly 76, as illustrated in FIGURE 6, to rupture the walls of the conduits 80 and 81 by rotary cutting action. The cutter 104 includes extensible knives 105 adapted to be extended into cutting contact with a tubing string, such as the conduit 80 in which the cutter is positioned. A description of a commercial cutter, such as the cutter 104, may be found on page 5805 of the 1960–1961, 24th revision, of the Composite Catalogue of Oil Field Equipment. In application to the apparatus of the present invention, the casing cutter 104 would be secured to a drill string 106 and lowered into the position illustrated in FIGURE 6 through the tubing string 62 illustrated in FIGURE 2. After reaching the desired position, the casing cutter would be activated and the drill string rotated to cut an annular opening through the conduit 80 into the annular chamber 102. Concurrent with this operation, or subsequent thereto, an annular opening would be cut through the conduit 81 into the chamber 103 in a like manner.

After the conduits 80 and 81 have been cut, and the casing cutter has been removed therefrom, the actuating piston 90 may be reciprocated by subjecting one of the conduits to a relatively high pressure with respect to the other. For example, with the piston 90 in the position illustrated in FIGURE 5 and the conduits 80 and 81 in the cut condition, if the conduit 81 is subjected to a relatively high pressure with respect to the conduit 80, the piston would be forced to the upper extremity of the recess 91. When the piston 90 is forced to the upper extremity of the recess 91, the grooves in the piston below the cammed surfaces 92 and 92 are juxtaposed to the sealing element 87 and locking dogs 85 and, thus the sealing element and locking dogs may retract into the lockdown assembly 76 to a position flush with the outer surface thereof. This latter condition is assumed when the lockdown assembly 76 is pulled out of the receiver 71 and the locking dogs 85 are biased inwardly by the cammed surfaces of the recess 75.

The packer apparatus illustrated in FIGURE 7 comprises a packer assembly adapted to apply fluid pressure to the annular chambers 102 and 103 after the chambers have been ruptured by the cutter 104. In this figure, the packer assembly is designated by the numeral 107 and is shown located in the conduit 80 in juxtaposition to an annular opening 110 therein which has been formed through means of the cutter 104 illustrated in FIGURE 6. The packer assembly 107 includes a pair of spaced dumbbell type packers 111 and 112 secured to a fluid pressure conduit 113 in sealed engagement therewith. As illustrated, the conduit 113 extends through the packer 111 and is closed at the end extending into the packer 112. The intermediate portion of the conduit 113 extending between the packers is provided with at least one perforation 114 communicating with the area between the packers. In order to insured sealed engagement between the packers and the conduit in which the packers are being used, each of the packers has secured to the periphery thereof a pair of resilient sealing elements 115.

In application of the packer 107 to the embodiment of the invention illustrated in FIGURE 5, the packer is lowered to the position illustrated in FIGURE 7 after the conduits 80 and 81 have been ruptured by the cutter of FIGURE 6. Generally, it is sufficient to lower a packer assembly into only the conduit to which it is desired to impart high pressure with respect to the other conduit. However, if desired, a packer assembly may be lowered into each of the conduits and a differential in pressure may be established by imparting a differential in pressure to the conduits 113 communicating with packer assemblies. Locating of the packers in juxtaposition to the opening 110 may be accomplished by adjusting the length of the conduit 113 to a length equal to the length of the drill string 106 used when the openings 110 were cut.

At this point, it is noted that a differential in pressure may be applied between the conduits 80 and 81 through means other than the packer assembly 107 of FIGURE 7. For example, packers may be run into the conduits 80 and 81 to a position below the openings 110 cut therethrough and the closed volumes above the packers may be subjected to a differential in pressure through conventional conduit means, such as the tubing strings 61 and 62, communicating with the conduits 80 and 81. It is also noted that in circumstances where it is necessary to activate the alternative operating system of the coupling apparatus of FIGURE 5, and the corresponding alternative operating systems to be described subsequently, the primary actuating lines of the apparatus may have been severed and opened to the relatively low pressure in the environment surrounding the apparatus. Under these circumstances, activating fluid supplied through the secondary actuating passages will be exhausted into the surrounding environment at the time it is being introduced into actuating mechanism of the coupling apparatus. Therefore, in order for the alternative operating system to be effective it must be capable of supplying a quantity of activating fluid in excess to that which may be exhausted through the primary actuating lines. In order to insure that such a quantity can be supplied, the passages of the alternative operating system (e.g., the passages 100 and 101 of the FIGURE 5 embodiment) and the openings formed by the cutter 104 are sufficiently large to facilitate a flow therethrough exceeding the possible flow through the primary actuating lines.

Figure 8:
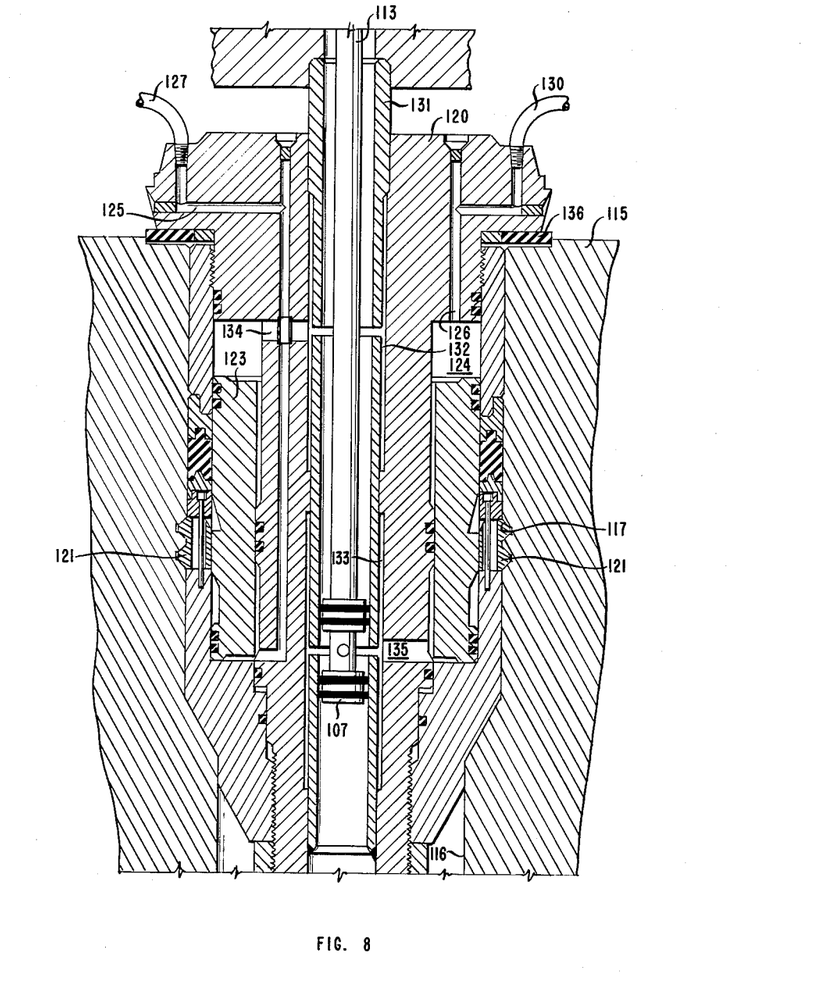
FIGURE 8 is a detailed sectional view similar to that of FIGURE 5, illustrating another embodiment of the apparatus of the invention adapted to remotely couple a single conduit in communication with an inexcessible receiver.

FIGURE 8 illustrates another embodiment of the coupling apparatus of the present invention, differing from that previously described primarily in that it is utilized to couple a single pair of conduits in fluid communication, rather than nested pairs as illustrated in FIGURE 5. In FIGURE 8, the numeral 115 designates a receiver corresponding substantially to the aforedescribed receiver 71, having a passage 116 extending axially therethrough with an internal locking recess 117 formed around the inner periphery thereof. The receiver 115 is shown with a lockdown assembly 120 telescoped in locked engagement with the passage 116. The lockdown assembly 120 is similar to the assembly 76 described with reference to FIGURE 5 in that it includes a plurality of locking dogs 121 spaced around the outer periphery thereof for extension into the locking recess 117. The assembly 120 is also similar to the assembly 76 in that it includes an extensible annular sealing element 122, an actuating piston 123 and an annular piston receiving recess 124 corresponding, respectively, to the components 87, 90 and 91 shown in FIGURE 5. The assembly 120 is provided with a manifold system to actuate the piston 123 through fluid pressure including a first conduit 125 communicating with the lower end of the recess 124 and a second conduit 126 communicating with the upper end of the recess. The conduits 125 and 126 communicate with primary actuating lines 127 and 130, respectively, which extend from the assembly 120 to an external source of controlled fluid under pressure. Thus, the piston 123 may be actuated in a manner corresponding to the actuation of the piston 90 of FIGURE 5 by subjecting the conduits 125 and 126 to a differential in pressure through means of the lines 127 and 130.

The lockdown assembly illustrated in FIGURE 8 is also similar to that of FIGURE 5 in that it is provided with an alternative operating system to subject the opposed ends of the recess 124 to fluid pressure should the primary actuating lines 127 and 130 become inoperative. This alternative system is included as part of the manifold system for the actuating piston and comprises a rupturable tube or conduit 131 extending axially through the assembly 120. The conduit 131 is received in the assembly 120 in sealed engagement therewith and is surrounded by an isolated pair of annular chambers 132 and 133 at its upper and lower ends, respectively. The chambers 132 and 133 communicate with the annular recess 124 through an upper actuating passage 134 extending between the recess 124 and the chamber 132 and a lower actuating passage 135 extending between the recess and the annular chamber 133. It is noted that in FIGURE 8 the apparatus of the invention is shown after the upper and lower sections of the tube 131 have been ruptured through means of a cutter, such as that illustrated in FIGURE 6. In addition to the ruptured condition of the tube 131, the tube is shown as having a packer assembly 107, corresponding to that described with reference to FIGURE 7, juxtaposed to the rupture in the lower section of the tube 131. With the packer assembly so positioned, the piston 123 may be forced to the upper extremity of the recess 124, thus releasing the lockdown assembly 120 from the receiver 115, by subjecting the chamber 133 and actuating passage 135 to high fluid pressure with respect to the upper end of the recess 124 through means of the conduit 113 to which the packer assembly is secured. If it is desired to use the alternative operating system to force the piston 123 to the lower end of the recess 124, it is merely necessary to move the packer assembly 107 to a location juxtaposed to the rupture cut in the upper section of the tube 131 and subject the ruptured section to relatively high fluid pressure through means of the conduit 113. Thus, it can be seen that the alternative operating system may be used in combination with the packer assembly 107 and conduit 113 to force the actuating piston 123 to either extremity of the recess 124.

Although the apparatus of FIGURE 8 has been shown with the conduit 131 in the ruptured condition and the packer 107 positioned within the conduit, it is to be understood that during normal operation of the apparatus the conduit is in an unruptured condition, such as the condition of the conduits 80 and 81 of the FIGURE 5 illustration. In the unruptured condition, the conduit 131 acts as a passage for fluid passing therethrough to a conduit that may be secured in fluid communication with the receiver 115. In this condition, the conduit 131 may be coupled or uncoupled from a conduit secured to the receiver through means of the primary actuating lines 127 and 130. It is noted, that in the coupled relationship illustrated in FIGURE 8, a seal 136 is interposed between the lockdown assembly 120 and receiver 115 in order to exclude foreign matter from interfering with the operation of the lockdown assembly.

Referring now to FIGURE 9, therein is illustrated another embodiment of the apparatus of the present invention. This apparatus differs from that described with reference to FIGURE 8 primarily in that the receiver 137 takes the form of a male member and the lockdown assembly 140 takes the form of a female member. More specifically, in FIGURE 9, the annular locking recess of the receiver 137 takes the form of an annular groove 141 around the outer periphery of the receiver. Furthermore, the locking dogs 142 and annular sealing element 143 of the lockdown assembly extend inwardly into engagement with the receiver 137, rather than outwardly into engagement with the receiver. Motion is imparted to the locking dogs and sealing element through means of an annular actuating piston 144 received in an annular recess 145 of the lockdown assembly 140 for reciprocating movement therein. The piston 144 differs from the pistons 90 and 123 of the previously described embodiments primarily in that its cammed actuating surfaces are on the inner periphery thereof rather than the outer periphery.

As with the FIGURES 5 and 8 embodiments of the invention, the piston 144 of the FIGURE 9 embodiment is actuated through a fluid manifolding system communicating with the opposed ends of the recess 145. This system includes primary actuating lines 146 and 147, respectively, communicating with the upper and lower ends of the recess 145. The system further includes an alternative operating system including conduits 150 and 151 extending through the assembly 140 to the upper and lower ends, respectively, of the recess 145. The conduits 150 and 151 extend to annular normally closed chambers 152 and 153, respectively, surrounding a conduit 154 extending axially through the assembly 140 in sealed engagement therewith. It is noted, that although the conduit 154 is normally closed to the chambers 152 and 153, FIGURE 9 illustrates a conduit as being ruptured and in communication with these chambers and also shows a packer assembly 107 juxtaposed to the lower chamber 153. The operation of the packer 107 illustrated in FIGURE 9 and its application in subjecting the chambers 152 and 153 to pressure in order to reciprocate the piston 144 is identical to that described with reference to the packer illustrated and described in FIGURE 8. Furthermore, during normal operation of the apparatus illustrated in FIGURE 9, the conduit or tube 154 is not in the ruptured condition and the packer 107 is not positioned within tube 154. Thus, normally the coupling apparatus is actuated through the lines 146 and 147, and the conduit 154 provides a passage whereby fluid may be communicated from a conduit secured to the lockdown assembly 140 into a conduit secured to the receiver 137.

Figure 10:
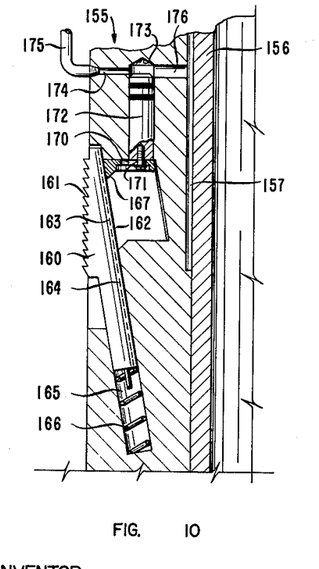

Referring now to FIGURE 10, therein is illustrated yet another embodiment of the invention adapted to couple a male lockdown assembly within a female receiver in a manner similar to that illustrated in FIGURE 8. In order to simplify the illustration of FIGURE 10, only a vertical section of one-half of the male lockdown assembly is shown. It is to be understood that this male assembly would be received in a female receiver or socket corresponding to the receiver 115 of FIGURE 8. The lockdown assembly 155 illustrated in FIGURE 10 is similar to the assembly 120 of FIGURE 8 in that it includes a rupturable tube or conduit 156 extending axially therethrough. As in the FIGURE 8 embodiment, the lockdown assembly 155 includes an annular chamber 157, corresponding to the chamber 133, extending around an intermediate section of the conduit 156. The lockdown assembly of FIGURE 10 differs materially from those previously described in that the locking elements thereof comprise a plurality of extensible slips 160 positioned around the periphery of the assembly, rather than extensible dogs as described with reference to FIGURES 5, 8 and 9. Although only a single slip 160 is illustrated, it is to be understood that a plurality of such slips are located at spaced intervals around the periphery of the assembly 155. Each of the slips 160 includes a serrated face 161 adapted to grip a female socket or receiver member into which the assembly is received, and thus lock the assembly within such a receiver without necessity of a locking recess in the receiver.

In order to provide for extension of the slip 160 with respect to the assembly 155, the rear surface 162 of the slip is formed at an angle with respect to the serrated surface 161. The rear surface 162 is also provided with a groove 163 adapted to slidably engage a track 164 extending from the surface of a socket 165 in which the finger is slidably received. In order to bias the slip 160 into the extended position shown in FIGURE 10, a compression coil spring 166 is interposed between the lower end of the slip and the socket 165. Extension of the upper end of the slip 161 is limited by a slotted arm 167 fixedly secured to the surface 162 and extending rearwardly therefrom. The arm 167 includes a stepped slot 170 extending therethrough, which slot is slidably received on the head of a bolt 171 secured to a piston 172 slidably received in a cylindrical recess 173 of the lockdown assembly.

In addition to restricting the outward extension of the slip 160, the piston 172 acts as a means to force the slip into retracted position within the socket 165. Thus, it can be seen that the spring 166 acts to normally bias the slip 160 into extended position, and the piston 172 may be utilized to retract the slip. The latter operation is accomplished through means of a fluid pressure manifold system communicating with the cylindrical recess 173 in a manner similar to the manifold systems described with reference to FIGURES 5, 8 and 9. The manifold system of the FIGURE 10 embodiment includes a first conduit 174 extending between the upper end of the recess 173 and a primary actuating line 175 extending to an external source of controlled fluid under pressure. Through the line 175, fluid pressure may be remotely applied to the piston 172 and thus the slip 160 may be retracted to permit the lockdown assembly 155 to be removed from a receiver or socket in which it is engaged.

The manifold system communicating with the upper end of the recess 173 also includes an alternative actuating passage 176 extending into communication with the annular chamber 157 for use therewith should the actuating line 175 become disabled. The alternative actuating passage 176 is utilized by opening the passage to pressure within the conduit 156 in a manner similar to the aforedescribed rupturing of the conduits 131 and 154 of FIGURES 8 and 9 respectively. Specifically, in the latter operation a cutter, such as the cutter 104, is lowered into the conduit 156 to cut a passage through the conduit into the chamber 157. After this passage has been cut through the conduit, the chamber 157, passage 176 and recess 173 may be subjected to fluid pressure to force the piston 172 downwardly. This pressure may be imparted by subjecting the entire conduit 156 to relatively high fluid pressure, or by lowering a packer assembly, such as the assembly 107, into the conduit 156 in juxtaposition to an opening cut therethrough. Thus, it is seen that the FIGURE 10 embodiment of the invention provides a coupling apparatus with primary and alternative operating means, suitable for use under both ideal and adverse conditions.

To summarize, FIGURES 5, 8, 9 and 10 illustrate embodiments of the present invention suitable for use with underwater installations as shown in FIGURES 1 to 4. During normal operation and application of the invention, components desired to be secured to an underwater installation are lowered to the installation on guide lines, such as the lines 25 and 26 of FIGURE 1. After the receiver and lockdown assemblies assume a telescoped engaged position, the primary actuating lines, such as the lines 42 and 43 of FIGURE 1 are subjected to a differential in pressure from a remote operating location and, thus the extensible locking components of the lockdown assembly are forced into locked engagement with the receiver to which the lockdown assembly is being secured. In specific application, the casing head 22 and coupling mechanism 41 may take the form of the receiver 137 and lockdown assembly 140 of the FIGURE 9 embodiment. In this case, should the primary actuating lines become disabled, the alternative operating system including the chambers 152 and 153 and the passages in communication therewith may be utilized to either couple or uncouple the lockdown assembly from its receiver. It is to be understood that a single wellhead assembly may include a plurality of the lockdown apparatuses of the present invention. For example, in FIGURE 1 both the running tool 35 and coupling mechanism 41 may take the form of the lockdown assembly 140 of FIGURE 9. Furthermore, the wellhead connector 51 and landing head 52 of the FIGURE 2 embodiment may also have internal structures corresponding substantially to the lockdown assembly 140 of FIGURE 9.

From the alternative apparatuses set forth in the above description and accompanying illustrations, it is believed apparent that the generic concept of the present invention is not limited to a particular structure or design. Therefore, various changes in the details of the described methods and illustrated constructions may be made, within the scope of the appended claims, without departing from the spirit of the invention.

I claim as my invention:

1. An apparatus for selectively uncoupling a conduit from an underwater installation, said conduits having a substantially vertical passage through which a smaller-diameter conduit may be lowered, said apparatus comprising:

a lockdown assembly secured to the conduit adjacent a free end thereof said lock-down assembly having a substantially vertical passage in register with the passage of said conduit;

a lockdown receiver fixed to the underwater installation, said receiver being dimensioned to receive said lockdown assembly in telescopic engagement therewith;

locking means carried by said lockdown assembly and being moveable with respect thereto into and out of locked engagement with said lockdown receiver when said assembly is in telescopic engagement with said receiver;

fluid pressure operated actuating means carried by said lockdown assembly and operatively associated with said locking means to move said locking means at least to unlocked disengagement with said receiver;

said manifold including at least two separate passageways for conducting pressurized fluid to said actuating means, said passageways providing a primary and a secondary fluid conduit means to provide a source of pressure fluid to at least unlock said actuating means, the volumetric flow capacity of said primary fluid conduit means being less than the volumetric flow capacity of said secondary fluid conduit means, said primary fluid conduit means extendable to a primary external source of fluid under pressure; and rupturable diaphragm means interposed between said secondary conduit means of said manifold means and the interior of the conduit.

2. An apparatus for selectively uncoupling a conduit from an underwater installation, said conduits having a substantially vertical passage through which a smaller-diameter conduit may be lowered, said apparatus comprising:

a lockdown assembly secured to the conduit adjacent a free end thereof said lock-down assembly having a substantially vertical passage in register with the passage of said conduit;

a lockdown receiver fixed to the underwater installation, said receiver being dimensioned to receive said lockdown assembly in telescopic engagement therewith;

locking means carried by said lockdown assembly and being moveable with respect thereto into and out of locked engagement with said lockdown receiver when said assembly is in engagement with said receiver;

sealing means carried by said lockdown assembly and being extensible therefrom to establish a sealed connection between said lockdown assembly and said lockdown receiver when said assembly is in telescopic engagement with said receiver;

fluid pressure operated actuating means carried by said lockdown assembly and operatively associated with said locking and sealing means to selectively move said locking means and extend said sealing means;

said manifold including at least two separate passageways for conducting pressurized fluid to said actuating means, said passageways providing a primary and a secondary fluid conduit means to provide a source of pressure fluid to at least unlock said actuating means, the volumetric flow capacity of said primary fluid conduit means being less than the volumetric flow capacity of said secondary fluid conduit means, said primary fluid conduit means extendable to a primary external source of fluid under pressure; and rupturable diaphragm means interposed between said secondary conduit means of said manifold means and the interior of the conduit.

3. An apparatus for selectively uncoupling a conduit from an underwater installation, said conduits having a substantially vertical passage through which a smaller-diameter conduit may be lowered, said apparatus comprising:

a lockdown assembly secured to the conduit adjacent a free end thereof said lock-down assembly having a substantially vertical passage in register with the passage of said conduit;

a lockdown receiver fixed to the underwater installation, said receiver being dimensioned to receive said lockdown assembly in telescopic engagement therewith;

locking means carried by said lockdown assembly for extension and retraction therefrom, said locking means functioning to lock said lockdown assembly and lockdown receiver in telescopic engagement upon extension thereof;

fluid operated piston means carried by said assembly for reciprocation therein, said piston means being operatively associated with said locking means to facilitate extension and retraction of said locking means upon reciprocation of said piston means;

said manifold including at least two separate passageways for conducting pressurized fluid to said actuating means, said passageways providing a primary and a secondary fluid conduit means to provide a source of pressure fluid to at least unlock said actuating means, the volumetric flow capacity of said primary fluid conduit means being less than the volumetric flow capacity of said secondary fluid conduit means, said primary fluid conduit means extendable to a primary external source of fluid under pressure; and rupturable diaphragm means interposed between said secondary conduit means of said manifold means and the interior of the conduit.

4. An apparatus for selectively uncoupling a conduit from an underwater installation, said conduits having a substantially vertical passage through which a smaller-diameter conduit may be lowered, said apparatus comprising:

a lockdown receiver fixed to one of the underwater installations, said receiver having a passage extending therein and a recess formed in the surface of said passage;

a lockdown assembly secured to the conduit adjacent a free end thereof said lock-down assembly having a substantially vertical passage in register with the passage of said conduit, said assembly being dimensioned to be received in the passage of said lockdown receiver in telescopic engagement therewith;

locking means carried by said lockdown assembly and being moveable with respect thereto into and out of locked engagement with the recess in the passage of said lockdown receiver when said assembly is in telescopic engagement with said receiver;

fluid pressure operated actuating means carried by said lockdown assembly and operatively associated with said locking means to move said locking means at least to unlocked disengagement with said recess;

said manifold including at least two separate passageways for conducting pressurized fluid to said actuating means, said passageways providing a primary and a secondary fluid conduit means to provide a source of pressure fluid to at least unlock said actuating means, the volumetric flow capacity of said primary fluid conduit means being less than the volumetric flow capacity of said secondary fluid conduit means, said primary fluid conduit means extendable to a primary external source of fluid under pressure; and rupturable diaphragm means interposed between said secondary conduit means of said manifold means and the interior of the conduit.

5. An apparatus for selectively uncoupling a conduit from an underwater installation, said conduits having a substantially vertical passage through which a smaller-diameter conduit may be lowered, said apparatus comprising:

a lockdown receiver fixed to the underwater installation, said lockdown receiver having a locking recess formed in the exterior surface thereof;

a lockdown assembly secured to the conduit adjacent a free end thereof said lock-down assembly having a substantially vertical passage in register with the passage of said conduit, said assembly having a passage extending therethrough into communication with the interior of the conduit, said passage being dimensioned to receive said lockdown receiver in telescopic engagement therein;

locking means carried by said lockdown assembly and being moveable with respect thereto into and out of engagement with the locking recess of said lockdown receiver when said receiver is in telescopic engagement with the passage of said lockdown assembly;

fluid pressure operated actuating means carried by said lockdown assembly and operatively associated with said locking means to selectively move said locking means into locked engagement with said locking recess;

said manifold including at least two separate passageways for conducting pressurized fluid to said actuating means, said passageways providing a primary and a secondary fluid conduit means to provide a source of pressure fluid to at least unlock said actuating means, the volumetric flow capacity of said primary fluid conduit means being less than the volumetric flow capacity of said secondary fluid conduit means, said primary fluid conduit means extendable to a primary external source of fluid under pressure; and rupturable diaphragm means interposed between said secondary conduit means of said manifold means and the interior of the conduit.

6. An apparatus for selectively uncoupling a conduit from an underwater installation, said conduits having a substantially vertical passage through which a smaller-diameter conduit may be lowered, said apparatus comprising:

a lockdown assembly secured to the conduit adjacent a free end thereof said lock-down assembly having a substantially vertical passage in register with the passage of said conduit;

a lockdown receiver fixed to the underwater installation, said receiver being dimensioned to receive said lockdown assembly in telescopic engagement therewith;

locking means carried by said lockdown assembly and being moveable with respect thereto into and out of locked engagement with said lockdown receiver when said assembly is in telescopic engagement with said receiver, said locking means having serrated faces to facilitate locked engagement with said lockdown receiver;

fluid pressure operated actuating means carried by said lockdown assembly and operatively associated with said locking means to selectively move said locking means into locked engagement with said receiver;

said manifold including at least two separate passageways for conducting pressurized fluid to said actuating means, said passageways providing a primary and a secondary fluid conduit means to provide a source of pressure fluid to at least unlock said actuating means, the volumetric flow capacity of said primary fluid conduit means being less than the volumetric flow capacity of said secondary fluid conduit means, said primary fluid conduit means extendable to a primary external source of fluid under pressure; and rupturable diaphragm means interposed between said secondary conduit means of said manifold means and the interior of the conduit.

References Cited by the Examiner
UNITED STATES PATENTS

| | | | |
|---|---|---|---|
| 1,929,826 | 10/1933 | Reynolds | 285—145 |
| 2,402,699 | 6/1946 | Williams | 91—471 |
| 2,897,895 | 8/1959 | Ortloff. | |
| 2,962,096 | 11/1960 | Knox. | |
| 3,044,266 | 7/1962 | Svenson | 91—471 |
| 3,052,299 | 9/1962 | Geer | 166—66.5 |
| 3,071,188 | 1/1963 | Raulins. | |
| 3,115,933 | 12/1963 | Haeber | 166—66.5 |

CARL W. TOMLIN, *Primary Examiner.*